United States Patent
Sang

(10) Patent No.: US 10,032,015 B2
(45) Date of Patent: Jul. 24, 2018

(54) PASSWORD INPUT METHOD BASED ON A TWO-STAGE CONVERSION AND A SYSTEM USING THEREOF

(71) Applicant: Yongpeng Sang, Wuhan (CN)

(72) Inventor: Yongpeng Sang, Wuhan (CN)

( * ) Notice: Subject to any disclaimer, the term of this patent is extended or adjusted under 35 U.S.C. 154(b) by 0 days.

(21) Appl. No.: 15/671,111

(22) Filed: Aug. 7, 2017

(65) Prior Publication Data

US 2017/0337368 A1 Nov. 23, 2017

Related U.S. Application Data

(63) Continuation-in-part of application No. 14/913,211, filed as application No. PCT/CN2015/072711 on Feb. 11, 2015, now abandoned.

(30) Foreign Application Priority Data

Oct. 13, 2014 (CN) .......................... 2014 1 0537714

(51) Int. Cl.
  *G06F 21/00* (2013.01)
  *G06F 21/36* (2013.01)
  *G06F 21/84* (2013.01)

(52) U.S. Cl.
  CPC .............. *G06F 21/36* (2013.01); *G06F 21/84* (2013.01)

(58) Field of Classification Search
  CPC ..... G06F 21/31; G06F 21/83; H04L 2209/04; G05F 5/00; G05F 7/00; G05F 21/36; G05F 21/84
  See application file for complete search history.

(56) References Cited

U.S. PATENT DOCUMENTS

2014/0068754 A1\* 3/2014 Burkill .................... G06F 21/36
726/18

FOREIGN PATENT DOCUMENTS

WO    WO 2015/078184    \* 6/2015

\* cited by examiner

*Primary Examiner* — Kendall Dolly
(74) *Attorney, Agent, or Firm* — Matthias Scholl, PC; Matthias Scholl

(57) ABSTRACT

The invention discloses a password input method based on a two-stage conversion. The method specifically includes providing password symbols and randomly providing password-proxy symbols, and building a two-sage association between the password symbols and the password-proxy symbols.

5 Claims, 3 Drawing Sheets

| 7 | 8 | 9 |
|---|---|---|
| 4 | 5 | 6 |
| 1 | 2 | 3 |
| 0 | Clear | OK |

(a)

| a | b | c |
|---|---|---|
| d | e | f |
| g | h | i |
| j | Clear | OK |

(b)

| 8 | 4 | 0 |
|---|---|---|
| 5 | 7 | 2 |
| 3 | 9 | 6 |
| 1 | Clear | OK |

(c)

| b | c | d |
|---|---|---|
| e | a | g |
| f | i | j |
| h | Clear | OK |

(d)

| g | e | f |
|---|---|---|
| a | d | h |
| j | b | i |
| c | Clear | OK |

(e)

| 7 | 3 | 4 |
|---|---|---|
| 1 | 0 | 8 |
| 2 | 5 | 6 |
| 9 | Clear | OK |

PASSWORD INPUT METHOD BASED ON A TWO-STAGE CONVERSION AND A SYSTEM USING THEREOF

CROSS-REFERENCE TO RELATED APPLICATIONS

This application a continuation-in-part of and claims domestic priority to U.S. patent application Ser. No. 14/913,211, filed Feb. 19, 2016, now pending, which is a National Stage Appl. filed under 35 U.S.C. 371 of International Pat. Appl. No. PCT/CN2015/072711 with an international filing date of Feb. 11, 2015, designating the United States, and further claims foreign priority to Chinese Pat. Appl. No. CN 201410537714.6 filed Oct. 13, 2014. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, and Cambridge, Mass. 02142.

BACKGROUND OF THE INVENTION

Field of the Invention

The invention relates to the field of computer information security, and more particularly to a password input method based on a two-stage association and a system using the same.

Description of the Related Art

In conventional password authentication systems, passwords in the format of alphabets, numbers, special characters, or combinations thereof are input. However, for security reasons, the system requires users to use strong passwords (such as combinations of capital/small letters, numbers and some special characters) that take up large space. Thus, the passwords are not easily decrypted. This presents a problem. In contrast, users are prone to use comparatively short or familiar passwords thus bringing about a fatal security problem: it is possible for hackers to decrypt the passwords of the users and to steal information by brute force attacks, dictionary attacks, etc.

D. Klein pointed out that it is possible to crack ¼ of 14000 passwords by using a dictionary containing 3000000 words, and E. Spafford stated that passwords of half of existing websites can be decrypted by using 1988 UNIX-based online dictionaries and 432 words. In addition, as processing speeds of modern computers significantly increase, more complex and advanced attack dictionaries can be used for easily decrypting or hacking passwords, and correspondingly, decryption speeds become higher than before.

In addition, the conventional password authentication systems require for verifying a password that a user input a character sequence that is the same as the password that is registered in the authentication systems. Therefore, password verification in the conventional password authentication systems is insecure as it allows the password to be watched and/or stolen, e.g., by a person or by a Trojan-horse program.

SUMMARY OF THE INVENTION

In view of the above-mentioned problems, it is an objective of the invention to provide a password input method and a system based on a two-stage association capable of effectively preventing stealing and decryption of passwords by creating password-proxy symbols between the password symbols and the input symbols to build a two-stage association between the password symbols and the input symbols, so that the input symbols are different from the password symbols.

To achieve the above objective, in accordance with one embodiment of the invention, there is provided a password input method for a password input device, the symbols for forming the password being registered in the password input device, the password input device comprising a central processing unit (CPU) and a screen; the method comprising steps by means of the CPU:

(1) providing a plurality of password symbols which comprises the symbols for forming the password;

(2) randomly providing a plurality of password-proxy symbols which has the same number as the plurality of password symbols;

(3) randomly displaying the plurality of password symbols as a first password group and the plurality of proxy-password symbols as a first password-proxy group in the same pattern of a column or matrix on the screen;

(4) randomly displaying the plurality of password symbols as a second password group the plurality of proxy-password symbols as a second password-proxy group in the same pattern of a column or matrix on the screen;

(5) associating each password symbol in the first password group with one password-proxy symbols in the first password-proxy group, in which the associated password symbol in the first password group and the password-proxy symbol in the first password-proxy group have the same position (with respect to other symbols in each group);

(6) associating each password symbol in the second password group with one password-proxy symbol in the second password-proxy group, in which the associated password symbol in the second password group and the password-proxy symbol in the second password-proxy group have the same position (with respect to other symbols in each group);

(7) displaying a first information on the screen to notify the user that the password symbol in the first password group and the password-proxy symbol in the first password-proxy group having the same position (with respect to other symbols in each group) correspond to each other; and that the password symbol in the second password group and the password-proxy symbol in the second password-proxy group having the same position correspond to each other;

(8) displaying a second information on the screen for the user to give notice of finding the same first symbol as a symbol for forming the password in the second password group, finding a second symbol corresponding to the first symbol in the second password-proxy group, finding the same third symbol as the second symbol in the first password-proxy group, and finding a fourth symbol corresponding to the third symbol in the first password group;

(9) displaying a third information on the screen for the user to give notice of inputting the same symbol as the fourth symbol;

(10) storing a symbol input by the user in the password input device;

(11) searching for the same fifth symbol as the symbol stored in (10) in the first password group, searching for a sixth symbol corresponding to the fifth symbol in the second password-proxy group, searching for the same seventh symbol as the sixth symbol in the first password-proxy group, and searching for an eighth symbol corresponding to the seventh symbol in the first password group;

(12) determining the eighth symbol as one symbol for forming the password;

(13) repeating (2) to (12) to determine remaining symbols for forming the password; and

(14) combining all symbols for forming the password determined in (12) and (13) to form a password, and storing the password in the password input device.

In a class of this embodiment, the password symbols are selected from alphabets, numbers, special characters, Chinese characters, graphs, images, or a combination thereof.

In a class of this embodiment, the password-proxy symbols are selected from alphabets, numbers, special characters, Chinese characters, graphs, images, or a combination thereof.

In a class of this embodiment, the password symbols are substantially different from the password-proxy symbols.

In a class of this embodiment, the password symbols are selected from alphabets, numbers, or a combination thereof, and the password-proxy symbols are selected from special characters, graphs, images, or a combination thereof.

In accordance with another embodiment of the invention, there is provided a password input system based on a two-stage association, the system comprising a screen, and a CPU having a software program; the software program comprising:

a first module configured to provide multiple password symbols that comprise the symbols for forming the password;

a second module configured to randomly provide multiple password-proxy symbols having the same number as the password symbols;

a third module configured to randomly display the password symbols as a first password group and the proxy-password symbols as a first password-proxy group in the same pattern of a column or a matrix on the screen;

a fourth module configured to randomly display the password symbols as a second password group and the proxy-password symbols as a second password-proxy group in the pattern of a column or matrix on the screen;

a fifth module configured to associate each password symbol in the first password group with one password-proxy symbol in the first password-proxy group, in which the associated password symbol in the first password group and the password-proxy symbol in the first password-proxy group have the same position (relative position in each group);

a sixth module configured to associate each password symbol with the second password group to one password-proxy symbol in the second password-proxy group, in which the associated password symbol in the second password group and the password-proxy symbol in the second password-proxy group have the same position (relative position in each group);

a seventh module display a first information on the screen to notify the user that the password and password-proxy symbols in the first password and password-proxy groups having the same position (relative position in each group) correspond to each other; and that the password and password-proxy symbols in the second password and password-proxy groups having the same position correspond to each other;

an eighth module configured to display a second information on the screen for the user to give notice of finding the same first symbol as a symbol for forming the password in the second password group, finding a second symbol corresponding to the first symbol in the second password-proxy group, finding the same third symbol as the second symbol in the first password-proxy group, and finding a fourth symbol corresponding to the third symbol in the first password group;

a ninth module configured to display a third information on the screen for the user to give notice of inputting the same symbol as the fourth symbol;

a tenth module configured to store a symbol input by the user in the password input system;

an eleventh module configured to search for the same fifth symbol as the symbol stored in the tenth module in the first password group, search for a sixth symbol corresponding to the fifth symbol in the second password-proxy group, search for the same seventh symbol as the sixth symbol in the first password-proxy group, and search for an eighth symbol corresponding to the seventh symbol in the first password group;

a twelfth module configured to determine the eighth symbol as one symbol for forming the password;

a thirteenth module configured to repeatedly control the second module through the twelfth module to operate; and a fourteenth module configured to combine all symbols for forming the password determined by the twelfth and thirteenth modules to form the password, and to store the password in the password input system.

Advantages of the invention comprise:

1) by using the password-proxy symbols to create a first-stage association and a second-stage association between the password symbols including the symbols for forming the password and the password-proxy symbols, the input symbols finally input by a user should be determined by the password reminded by the user and the two-stage association relationships. The randomly-generated two-stage association relationships provide two masks for the real password symbols such that the input symbols that are substantially different from the actual password symbols, which makes it highly reliable in preventing the password being watched or stolen.

2) the randomly generated two-stage association relationships vary in each input for entering an individual symbol for forming the password, such that there are no routine or predictable mathematical paths for decoding the password, which significantly improves the reliability in preventing the password being broken.

BRIEF DESCRIPTION OF THE DRAWINGS

FIG. 1 illustrates a first example of the invention, in which FIG. 1(a) shows the password symbols of an ATM machine in the first example, FIG. 1(b) shows the password-proxy symbols provided in the first example, FIGS. 1(c) and 1(d) show a first-stage association relationship in the first example, and FIGS. 1(e) and 1(f) show a second-stage association relationship in the first example;

FIG. 2 illustrates a second example of the invention, in which FIG. 2(a) shows the password symbols of an ATM machine in the second example, FIG. 2(b) shows the password-proxy symbols provided in the second example, FIG. 2(c) shows a first-stage association relationship in the second example, and FIG. 2(d) shows a second-stage association relationship in the second example; and FIG. 3 illustrates a third example of the invention, in which FIG. 3(a) shows the password symbols of an ATM machine in the third example, FIG. 3(b) shows the password-proxy symbols created in the third example, FIG. 3(c) shows a first-stage association relationship in the third example, and FIG. 3(d) shows a second-stage association relationship in the third example.

DETAILED DESCRIPTION OF THE EMBODIMENTS

Figure 2:
Figure 2:
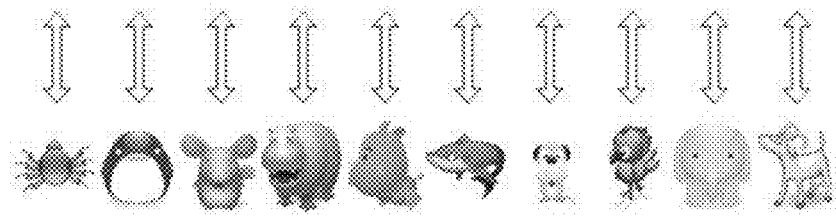

For clear understanding of the objectives, features and advantages of the invention, detailed description of the invention will be given below in conjunction with accompanying drawings and specific embodiments. It should be noted that the embodiments are only meant to explain the invention, and not to limit the scope of the invention.

A password input method for an automated teller machine (ATM) having a CPU and a screen of the invention comprises steps by means of the CPU:

(1) providing a plurality of password symbols of which the subset group comprises the subset group of the symbols for forming the password;

(2) randomly providing a plurality of password-proxy symbols having the same number as the number of the plurality of password symbols;

(3) randomly displaying the plurality of password symbols as a first password group and the plurality of proxy-password symbols as a first password-proxy group in the same pattern of a column or matrix as shown in FIGS. 1(c)-1(d), 2(c), and 3(c), on the screen;

(4) randomly displaying the plurality of password symbols as a second password group and the plurality of proxy-password symbols as a second password-proxy group in the same pattern of a column or matrix as shown in FIGS. 1(e)-1(f), 2(d), and 3(d), on the screen;

(5) associating each password symbol in the first password group with one password-proxy symbol in the first password-proxy group, in which the associated password symbol in the first password group and the password-proxy symbol in the first password-proxy group have the same position (relative position in each group);

(6) associating each password symbol in the second password group with one password-proxy symbol in the second password-proxy group, in which the associated password symbol in the second password group and the password-proxy symbol in the second password-proxy group have the same position (relative position in each group);

(7) displaying a first information on the screen to notify a user that the password and password-proxy symbols in the first password and password-proxy groups having the same position (relative position in each group) correspond to each other; and that the password and password-proxy symbols in the second password and password-proxy groups having the same position correspond to each other;

(8) displaying a second information on the screen for the user to give notice of finding the same first symbol as a symbol for forming the password in the second password group, finding a second symbol corresponding to the first symbol in the second password-proxy group, finding the same third symbol as the second symbol in the first password-proxy group, and finding a fourth symbol corresponding to the third symbol in the first password group;

(9) displaying a third information on the screen for the user to give notice of inputting the same symbol as the fourth symbol;

(10) storing a symbol input by the user in the password input device;

(11) searching for the same fifth symbol as the symbol stored in (10) in the first password group, searching for a sixth symbol corresponding to the fifth symbol in the second password-proxy group, searching for the same seventh symbol as the sixth symbol in the first password-proxy group, and searching for an eighth symbol corresponding to the seventh symbol in the first password group;

(12) determining the eighth symbol as one symbol for forming the password;

(13) repeating (2) to (12) to determine remaining symbols for forming the password; and

(14) combining all symbols for forming the password determined in (12) and (13) to form a password, and entering the password in the password input device.

The password entered in the password input device is determined by the symbols input by the user through the keyboard of the password input device according to the first-stage association relationship and the second-stage association relationship, and vice versa.

The first-stage association relationship and the second-stage association relationship are built by associating each password symbol with one password-proxy symbol based on the spatial positions of the symbols in each group of the password symbols or each group of the password-proxy symbols. For example, in the first-stage association relationship as shown in FIGS. 1(c) and 1(d), the number "8" in the first row and first column of the 4×3 matrix as shown in FIG. 1(c) and the letter "b" in the first row and first column of the 4×3 matrix as shown in FIG. 1(d) correspond to each other. In another example, in the second-stage association relationship as shown in FIG. 2(d), the number "8" in the sixth place of the numeral row as shown in FIG. 2(d) and the image "sheep" in the sixth place of the image row as shown in FIG. 2(d) correspond to each other.

The password symbols are selected from alphabets, numbers, special characters, Chinese characters, graph, image, or a combination thereof. More particularly, the password symbols are characters that are capable of being entered in the ATM through the keyboard (may be a hardware keyboard or a virtual on-screen keyboard) of the password input device.

The password-proxy symbols are selected from alphabets, numbers, special characters, Chinese characters, graphs, images, or a combination thereof.

The alphabet is an English alphabet, a Latin alphabet, a Greek alphabet or so on.

The number is 0, 1, 2, 3 or so on.

The special character is a punctuation mark, a mathematical operator, a tab or so on.

The graph is any visual graph such as a rectangle, a diamond, a triangle, a circular or so on.

The image is an image of a human body or a part thereof, an image of a natural object such as a mountain, water, a tree, an animal or so on, or an image of a man-made image such as a vehicle, a boat, a plane, a desk, a chair or so on.

Preferably, the password symbols are substantially different from the password-proxy symbols.

Preferably, the password symbols are selected from alphabets, numbers, or a combination thereof, and the password-proxy symbols are selected from special characters, graphs, images, or a combination thereof.

Preferably, each of the first-stage association relationship and the second-stage association relationship is shown in a manner of a sequence or a matrix.

Preferably, each of the first-stage association relationship and the second-stage association relationship is shown by displaying the password symbols in a certain column or matrix and displaying the password-proxy symbols in the certain column or matrix as shown in FIGS. 1(c)-1(f), 2(c)-2(d), and 3(c)-3(d).

It should be noted that the invention should not be limited to the two-stage association relationship, and three-stage, four-stage or other multi-stage association relationship can also be used. For example, if a three-stage association relationship is used between the password symbols and the password-proxy symbols, in addition to randomly displaying the password symbols and the password-proxy symbols on the screen to respectively build a first-stage association relationship and a second-stage association relationship as discussed above, a third-stage association relationship is required to be built by randomly displaying the password symbols and the password-proxy symbols on the screen. The more the number of stages is used, the higher complexity and security level the invention may have.

The method of the invention can be used in a wide variety of password systems, such as ATM machines, network banking, access control, file encryption systems, E-mail boxes and so on.

Example 1

As shown in FIG. 1(a), the password symbols in an ATM machine are formed by the numbers 0-9 which are allowed to be entered through an input keypad of the ATM machine. As shown in FIG. 1(b), ten letters a to j are used as the password-proxy symbols in the ATM machine. When the ATM machine is in use, the following procedures are applied:

A1) the first-stage association relationship is created through the steps (1)-(3) and (5) of the method and displayed on a screen of the ATM machine as shown in FIGS. 1(c) and 1(d), and the second-stage association relationship is created through the steps (1)-(2), (4), and (6) of the method and displayed on the screen as shown in FIGS. 1(e) and 1(f);

B1) the information notifying the user what the user should do is displayed on the screen through the steps (7)-(9) of the method;

C1) assuming the password of a user is '123941', when the user wants to enter the number '1' as the first symbol for forming the password, according to the information on the screen, firstly a letter 'a' in the second password-proxy group shown in FIG. 1(e) corresponding to the number '1' in the second password group shown in FIG. 1(f) in the second-stage association relationship in FIGS. 1(e) and 1(f) is found by the user, the password-proxy symbol 'a' in the second password-proxy group has the same position (in the second row and first column of the 4×3 matrix) as the number '1' in the second password group; and then a number '7' in the first password group shown in FIG. 1(c) corresponding to the letter 'a' in the first password-proxy group shown in FIG. 1(d) in the first-stage association relationship in FIGS. 1(c) and 1(d) is found by the user, the relative position (in the second row and second column) of the password-proxy symbol 'a' in the first password group in FIG. 1(d) is the same as the relative position of the number '7' in the first password-proxy in FIG. 1(c); and finally the user is required to input the number '7' on the keypad of the ATM machine;

D1) the first symbol '1' for forming the password is obtained and stored in the ATM after the CPU of the ATM operates through the steps (10)-(12) of the method, according to the number '7' input by the user and based on the two-stage association shown in FIGS. 1(c)-1(f).

If the user then wants to enter the number '2' as the second symbol for forming the password, two new association relationships are created and displayed through the above procedures A1)-B1), and then the same procedures C1)-D1) as above are applied. For the purpose of easy illustration and understanding, it is assumed that the two-step association relationships in inputting the number '2' as the second symbol for forming the password and in inputting the number '1' as the first symbol for forming the password are the same, a letter 'j' in the third row and first column of the matrix in the second password-proxy group shown in FIG. 1(e) corresponding to the number '2' in the third row and first column of the matrix in the second password group shown in FIG. 1(f) is found by the user; then a number '6' in the third row and third column of the matrix in the first password group shown in FIG. 1(c) corresponding to the letter 'j' in the third row and third column of the matrix in the first password-proxy group shown in FIG. 1(d) is found by the user; then the user is required to input the number '6' on the keypad of the ATM machine; and finally the first symbol '2' for forming the password is obtained and stored in the ATM after the CPU operates through the steps (10)-(12) of the method, according to the number '6' input by the user and based on the two-stage association shown in FIGS. 1(c)-1(f).

For the purpose of easy illustration and understanding, it is also assumed that the two-step association relationship in each of the following four times of input the numbers "3", "9", "4", and "1" for forming the password is the same as that in the first time, then finally password symbols input by the user should be '765437'.

Example 2

As shown in FIG. 2(a), the password symbols in an ATM machine are formed by the numbers 0-9 which are allowed to be entered through an input keypad of the ATM machine. As shown in FIG. 2(b), ten animal images are used as password-proxy symbols in the ATM machine. When the ATM machine is in use, the following procedures are performed:

A2) the first-stage association relationship is created through the steps (1)-(3) and (5) of the method and displayed on a screen of the ATM machine as shown in FIG. 2(c), and the second-stage association relationship is created through the steps (1)-(2), (4), and (6) of the method and displayed on the screen as shown in FIG. 2(d);

B2) the information notifying the user what the user should do is displayed on the screen through the steps (7)-(9) of the method;

C2) assuming the password of a user is '123941', when the user wants to enter the number '1' as the first symbol for forming the password, according to the information on the screen, firstly the animal image in the fourth place of the second password-proxy group in FIG. 2(d) corresponding to the number '1' in the fourth place of the second password group in FIG. 2(d) is found by the user; and then a number '7' in the first password group in FIG. 2(c) corresponding to the same animal image in the fifth place of the first password-proxy group in FIG. 2(c) as the animal image in the fourth place of the second password-proxy group in FIG. 2(d) is found by the user; and finally the user is required to input the number '7' on the keypad of the ATM machine;

D2) the first symbol '1' for forming the password is obtained and stored in the ATM after the CPU of the ATM through the steps (10)-(12) of the method, according to the number '7' input by the user and based on the two-stage association shown in FIGS. 2(c)-2(d).

If the user then wants to enter the number '2' as the second symbol for forming the password, two new association relationships are created and displayed through the above procedures A2)-B2), and then the same procedures C2)-D2) as above are applied. For the purpose of easy illustration and understanding, it is assumed that the two-step association relationships in inputting the number '2' as the second symbol for forming the password and in inputting the number '1' as the first symbol for forming the password are the same, the animal image in the seventh place of the column in the second password-proxy group in FIG. 2(*d*) corresponding to the number '2' in the seventh place of the column in the second password group in FIG. 2(*d*) is found by the user; then a number '6' in the ninth place of the column in the first password group shown in FIG. 2(*c*) corresponding to the same animal image in the ninth place of the column in the first password-proxy group shown in FIG. 2(*c*) as the animal image in the seventh place of the column in the second password-proxy group shown in FIG. 2(*d*) is found by the user; then the user is required to input the number '6' on the keypad of the ATM machine; and finally the first symbol '2' for forming the password is obtained and stored in the ATM after the CPU through the steps (10)-(12) of the method, according to the number '6' input by the user and based on the two-stage association shown in FIGS. 2(*c*)-2(*d*).

For the purpose of easy illustration and understanding, it is also assumed that the two-step association relationship in each of the following four times of input the numbers "3", "9", "4", and "1" for forming the password is the same as that in the first time, then finally password symbols input by the user should be '765437'.

Example 3

Figure 3:
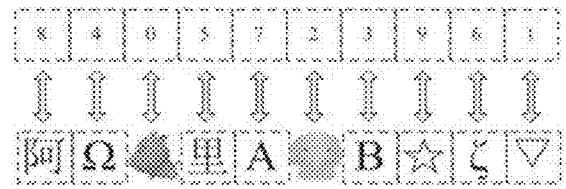
Figure 3:
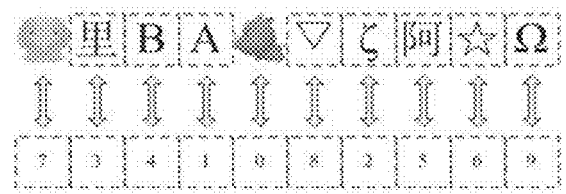

As shown in FIG. 3(*a*), the password symbols in an ATM machine are formed by the numbers 0-9 which are allowed to be entered through an input keypad of the ATM machine. As shown in FIG. 3(*b*), ten characters including texts, letters, and graphs are used as the password-proxy symbols in the ATM machine. When the ATM machine is in use, the following procedures are performed:

A3) the first-stage association relationship is created through the steps (1)-(3) and (5) of the method and displayed on a screen of the ATM machine as shown in FIG. 3(*c*), and the second-stage association relationship is created through the steps (1)-(2), (4), and (6) of the method and displayed on the screen as shown in FIG. 3(*d*);

B3) the information notifying the user what the user should do is displayed on the screen through the steps (7)-(9) of the method;

C3) assuming the password of a user is '123941', when the user wants to enter the number '1' as the first symbol for forming the password, according to the information on the screen, firstly the character in the fourth place of the second password-proxy group in FIG. 3(*d*) corresponding to the number '1' in the fourth place of the second password group in FIG. 3(*d*) is found by the user; and then a number '7' in the first password group in FIG. 3(*c*) corresponding to the same character in the fifth place of the first password-proxy group in FIG. 3(*c*) as the character in the fourth place of the second password-proxy group in FIG. 3(*d*) is found by the user; and finally the user is required to input the number '7' on the keypad of the ATM machine;

D3) the first symbol '1' for forming the password is obtained and stored in the ATM after the CPU of the ATM operates through the steps (10)-(12) of the method, according to the number '7' input by the user and based on the two-stage association shown in FIGS. 3(*c*)-3(*d*).

If the user then wants to enter the number '2' as the second symbol for forming the password, two new association relationships are created and displayed through the above procedures A3)-B3), and then the same procedures C3)-D3) as above are applied. For the purpose of easy illustration and understanding, it is assumed that the two-step association relationships in inputting the number '2' as the second symbol for forming the password and in inputting the number '1' as the first symbol for forming the password are the same, the character in the seventh place of the column in the second password-proxy group in FIG. 3(*d*) corresponding to the number '2' in the seventh place of the column in the second password group in FIG. 3(*d*) is found by the user; then a number '6' in the ninth place of the column in the first password group shown in FIG. 3(*c*) corresponding to the same character in the ninth place of the column in the first password-proxy group shown in FIG. 3(*c*) as the character in the seventh place of the column in the second password-proxy group shown in FIG. 3(*d*) is found by the user; then the user is required to input the number '6' on the keypad of the ATM machine; and finally the first symbol '2' for forming the password is obtained and stored in the ATM after the CPU operates through the steps (10)-(12) of the method, according to the number '6' input by the user and based on the two-stage association shown in FIGS. 3(*c*)-3(*d*).

For the purpose of easy illustration and understanding, it is also assumed that the two-step association relationship in each of the following four times of input the numbers "3", "9", "4", and "1" for forming the password is the same as that in the first time, then finally password symbols input by the user should be '765437'.

While preferred embodiments of the invention have been described above, the invention is not limited to disclosure in the embodiments and the accompanying drawings. Any changes or modifications without departing from the spirit of the invention fall within the scope of the invention.

What is claimed is:

1. A password input method for an automated teller machine (ATM), symbols for forming the password being registered in the ATM; the ATM comprising a central processing unit (CPU) and a screen; the method comprising steps by means of the CPU:
   (1) providing a plurality of password symbols, wherein said plurality of password symbols comprises the symbols for forming the password;
   (2) providing a plurality of password-proxy symbols, wherein a number of said plurality of password-proxy symbols is the same as a number of said plurality of password symbols;
   (3) constructing a two-stage conversion between said plurality of password symbols and said plurality of proxy-password symbols to associate the password with a symbol string that is different from the password by:
      (3a) constructing a first conversion between said plurality of password symbols and said plurality of proxy-password symbols by:
         (3a)(1) displaying in a random order said plurality of password symbols as a group comprising said symbol string in a pattern of a column or a matrix on the screen, and displaying in a random order said plurality of proxy-password symbols as a first password-proxy group in a pattern of a column or a matrix on the screen; wherein the pattern of said group comprising said symbol string is the same as the pattern of said first password-proxy group; and (3a)(2) associating each symbol in said group comprising said symbol string with one password-proxy symbol in said first password-proxy group, wherein a position of said each symbol in said group comprising said symbol string is the same as a position of said one password-proxy symbol in said first password-proxy group;

(3b) constructing a second conversion between said plurality of password symbols and said plurality of proxy-password symbols by:

(3b)(1) displaying in a random order said plurality of password symbols as a group comprising the password in a pattern of a column or a matrix on the screen, and displaying in a random order said plurality of proxy-password symbols as a second password-proxy group in a pattern of a column or a matrix on the screen; wherein the pattern of said group comprising the password is the same as the pattern of said second password-proxy group; and (3b)(2) associating each symbol in said group comprising the password with one password-proxy symbol in said second password-proxy group, wherein a position of said each symbol in said group comprising the password is the same as a position of said one password-proxy symbol in said second password-proxy group; and (3c) associating each symbol in said group comprising said symbol string with one symbol in said group comprising the password according to said first conversion and said second conversion, wherein said each symbol in said group comprising said symbol string and said one symbol in said group comprising the password are associated to the same password-proxy symbol;

(4) notifying a user association rules inherent in 3, 3(a), 3(a)1, 3(a)2, 3(b), 3(b)1, 3(b)2, and 3(c) among said group comprising said symbol string, said first password-proxy group, said second password-proxy group, and said group comprising the password;

(5) giving notice for the user of finding each symbol of the password in said group comprising the password, finding each associated symbol of said symbol string in said group comprising said symbol string according to said association rules, and inputting each associated symbol of said symbol string into the ATM;

(6) storing a symbol input by the user in the ATM;

(7) searching for a same symbol as said symbol input in (6) in said group comprising said symbol string, and searching for an associated password symbol in said group comprising the password according to said association rules;

(8) determining said associated password symbol as one symbol for forming the password;

(9) repeating (6), (7), and (8) to determine remaining symbols for forming the password; and

(10) combining all symbols for forming the password in (8) and (9) to form a password, and storing said password in the ATM.

2. The password input method of claim 1, wherein said plurality of password symbols is selected from alphabets, numbers, special characters, Chinese characters, graphs, images, or a combination thereof.

3. The password input method of claim 1, wherein said plurality of password-proxy symbols is selected from alphabets, numbers, special characters, Chinese characters, graph, images, or a combination thereof.

4. The password input method of claim 1, wherein said plurality of password symbols is substantially different from said plurality of password-proxy symbols.

5. The password input method of claim 1, wherein said plurality of password symbols is selected from alphabets, numbers, or a combination thereof, and said plurality of password-proxy symbols is selected from special characters, graphs, images, or a combination thereof.

* * * * *